US007596208B2

(12) United States Patent
Rifkin et al.

(10) Patent No.: US 7,596,208 B2
(45) Date of Patent: *Sep. 29, 2009

(54) APPARATUS SYSTEM, AND METHOD FOR HIGH FLUX, COMPACT COMPTON X-RAY SOURCE

(75) Inventors: Jeffrey Rifkin, Boulder, CA (US); Roderick J. Loewen, Redwood City, CA (US); Ronald D. Ruth, Stanford, CA (US)

(73) Assignee: Lyncean Technologies, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/856,282

(22) Filed: Sep. 17, 2007

(65) Prior Publication Data

US 2008/0002813 A1    Jan. 3, 2008

Related U.S. Application Data

(63) Continuation of application No. 11/077,524, filed on Mar. 9, 2005, now Pat. No. 7,277,526.

(60) Provisional application No. 60/560,848, filed on Apr. 9, 2004, provisional application No. 60/560,864, filed on Apr. 9, 2004, provisional application No. 60/560,845, filed on Apr. 9, 2004, provisional application No. 60/560,849, filed on Apr. 9, 2004, provisional application No. 60/561,014, filed on Apr. 9, 2004.

(51) Int. Cl.
*H05G 2/00* (2006.01)
*H05H 7/00* (2006.01)

(52) U.S. Cl. ............................ 378/119; 315/507
(58) Field of Classification Search ............... 378/119; 315/507

See application file for complete search history.

(56) References Cited

U.S. PATENT DOCUMENTS

| 4,598,415 | A | 7/1986 | Luccio et al. |
|---|---|---|---|
| 5,247,562 | A | 9/1993 | Steinbach |
| 5,353,291 | A | 10/1994 | Sprangle et al. |
| 5,825,847 | A | 10/1998 | Ruth et al. |
| 6,035,015 | A | 3/2000 | Ruth et al. |
| 6,459,766 | B1 | 10/2002 | Srinivasan-Rao |
| 6,687,333 | B2 | 2/2004 | Carroll et al. |
| 6,724,782 | B2 | 4/2004 | Hartemann et al. |
| 7,016,470 | B2 | 3/2006 | Lawrence et al. |

OTHER PUBLICATIONS

Loewen.,R. J., "A Compact Light Source: Design and Technical Feasibility Study of a Laser-Electron Storage Ring X-Ray Source," PhD thesis, Stanford University, Stanford, CA, Jun. 2003.

*Primary Examiner*—Edward J Glick
*Assistant Examiner*—Thomas R Artman
(74) *Attorney, Agent, or Firm*—Cooley Godward Kronish LLP

(57) ABSTRACT

A Compton backscattering x-ray source includes an electron storage ring for storing electron bunches. A timing system refreshes an orbiting electron bunch according to a schedule selected to improve at least one attribute of x-ray emission. In one implementation, the electron bunch is periodically refreshed with a period of at least about 10 Hz.

11 Claims, 9 Drawing Sheets

APPARATUS SYSTEM, AND METHOD FOR HIGH FLUX, COMPACT COMPTON X-RAY SOURCE

CROSS REFERENCE TO RELATED APPLICATIONS

This application is a continuation of U.S. patent application Ser. No. 11/077,524 filed on Mar. 9, 2005 which, claims the benefit of the following U.S. provisional patent applications: application Ser. No. 60/560,848 filed on Apr. 9, 2004, application Ser. No. 60/560,864, filed on Apr. 9, 2004; application Ser. No. 60/561,014, filed on Apr. 9, 2004; application Ser. No. 60/560,845, filed on Apr. 9, 2004; and application Ser. No. 60/560,849, filed on Apr. 9, 2004, the contents of each of which are hereby incorporated by reference.

STATEMENT REGARDING FEDERALLY SPONSORED RESEARCH

This invention was supported in part by a grant from the National Institutes of General Medical Sciences, National Institutes of Health, Department of Health and Human Services, grant number 4 R44 GM066511-02. This U.S. Government may have rights in this invention.

BACKGROUND OF THE INVENTION

Synchrotron x-ray radiation sources are of interest for many different fields of science and technology. A synchrotron x-ray radiation source has a wavelength that is tunable. Intense x-ray beams with wavelengths matched to the atomic scale have opened new windows to the physical and biological world. Powerful techniques such as x-ray diffraction and scattering are further enhanced by the tunability of synchrotron radiation that can exploit the subtleties of x-ray spectroscopy.

High flux synchrotrons are typically implemented as centralized facilities that use large magnetic rings to store high-energy electron beams. As an illustrative example, a conventional third generation synchrotron may have a diameter of over 100 meters and utilize a 2-7 Gev beam, which combined with insertion devices such as undulator magnets generate 1 Angstrom wavelength x-ray radiation.

The large physical size, high cost, and complexity of conventional synchrotrons have limited their applications. For example, in many universities, hospitals, and research centers there are limitations on floor space, cost, power, and radiation levels that make a conventional synchrotron impractical as a local source of x-ray radiation. As a result, there are many medical and industrial applications that have been developed using synchrotron radiation that are not widely used because of the unavailability of a practical local source of synchrotron radiation having the necessary x-ray intensity and spectral properties.

Research in compact synchrotron x-ray sources has led to several design proposals for local x-ray sources that use the effect of Compton scattering. Compton scattering is a phenomenon of elastic scattering of photons and electrons. Since both the total energy and the momentum are conserved during the process, scattered photons with much higher energy (light with much shorter wavelength) can be obtained in this way.

One example of a Compton x-ray source is that described in U.S. Pat. No. 6,035,015, "Compton backscattered collimated x-ray source" by Ruth, et al., the contents of which are hereby incorporated by reference. FIG. 1 shows the system disclosed in U.S. Pat. No. 6,035,015. The x-ray source includes a compact electron storage ring 10 into which an electron bunch, injected by an electron injector 11, is introduced by a septum or kicker 13. The compact storage ring 10 includes c-shaped metal tubes 12, 15 facing each other to form gaps 14, 16. An essentially periodic sequence of identical FODO cells 18 surround the tubes 12, 15. As is well known, a FODO cell comprises a focusing quadrupole 21, followed by a dipole 22, followed by a defocusing quadrupole 23, then followed by another dipole 24. The magnets can be either permanent magnets (very compact, but fixed magnetic field) or electromagnetic in nature (field strength varies with external current). The FODO cells keep the electron bunch focused and bend the path so that the bunch travels around the compact storage ring and repetitively travels across the gap 16. As an electron bunch circulates in the ring and travels across a gap 16, it travels through an interaction region 26 where it interacts with a photon or laser pulse which travels along path 27 to generate x-rays 28 by Compton backscattering. The metal tubes may be evacuated or placed in a vacuum chamber.

In the prior art Compton x-ray source of U.S. Pat. No. 6,035,015 a pulsed laser 36 is injected into a Fabry-Perot optical resonator 32. The resonator may comprise highly reflecting mirrors 33 and 34 spaced to yield a resonator period with a pulsed laser 36 injecting photon pulses into the resonator. At steady state, the power level of the accumulated laser or photon pulse in the resonator can be maintained because any internal loss is compensated by the sequence of synchronized input laser pulses from laser 36. The laser pulse repetition rate is chosen to match the time it takes for the electron beam to circulate once around the ring and the time for the photon pulse to make one round trip in the optical resonator. The electron bunch and laser or photon pulses are synchronized so that the light beam pulses repeatedly collide with the electron beam at the interaction region 26.

Special bending and focusing magnets 41, 42, and 43, 44, are provided to steer the electron bunch for interaction with the photon pulse, and to transversely focus the electron beam inside the vacuum chamber in order to overlap the electron bunch with the focused waist of the laser beam pulse. The optical resonator is slightly tilted in order not to block the x-rays 28 in the forward direction, FIG. 1. The FODO cells 18 and the focusing and bending magnets 41, 42 and 43, 44 are slotted to permit bending and passage of the laser pulses and x-ray beam into and out of the interaction region 26. The electron beam energy and circulation frequency is maintained by a radio frequency (RF) accelerating cavity 46 as in a normal storage ring. In addition, the RF field serves as a focusing force in the longitudinal direction to confine the electron beam with a bunch length comparable to the laser pulse length.

In the prior art Compton x-ray source of U.S. Pat. No. 6,035,015 the electron energy is comparatively low, e.g., 8 MeV compared with 3 GeV electron energies in conventional large scale synchrotrons. In a storage ring with moderate energy, it is well-known that the Coulomb repulsion between the electrons constantly pushes the electrons apart in all degrees of freedom and also gives rise to the so-called intra-beam scattering effect in which electrons scatter off of each other. In prior art Compton x-ray sources the laser-electron interaction is used to cool and stabilize the electrons against intra-beam scattering. By inserting a tightly focused laser-electron interaction region 26 in the storage ring, each time the electrons lose energy to the scattered photons and are subsequently re-accelerated in the RF cavity they move closer in phase space (the space that includes information on both the position and the momentum of the electrons), i.e., the electron beam becomes "cooler" since the random thermal motion of the electrons within the beam is less. This laser cooling is more pronounced when the laser pulse inside the optical resonator is made more intense, and is used to counterbalance the natural quantum excitation and the strong intra-beam scattering effect when an intense electron beam is stored. Therefore, the electron beam can be stabilized by the repetitive laser-electron interactions, and the resulting x-ray flux is significantly enhanced.

Conventional Compton x-ray sources have several drawbacks that have heretofore made them impractical in many applications. In particular, prior art compact Compton x-ray sources, such as that described in U.S. Pat. No. 6,035,015, are not sufficiently bright x-ray sources for narrowband applications, such as protein crystallography or phase contrast imaging. Narrowband applications (also known as "monochromatic" applications), are applications or techniques that commonly use a monochromater to filter or select a narrow band of x-ray energies from an incident x-ray beam. As an illustrative example, monochromators typically select less than 0.1% of the relative energy bandwidth. As a result, narrowband applications not only benefit from a source with a high total x-ray source but an x-ray flux that is comparatively bright within a narrow bandwidth.

The x-ray beam of prior art Compton x-ray sources, such as that described in U.S. Pat. No. 6,035,015, has a lower brightness than desired due in part to the large energy spread caused by the electron-laser interaction. The brightness is also less than desired because the optical power level that can be coupled into and stored in the Fabry-Perot cavity between mirrors 33 and 34 for use in Compton backscattering is less than desired, due to a number of limitations on the control, stability, and losses in different elements of the optics system. Additionally, U.S. Pat. No. 6,035,015 has the optical mirror 34 offset from the path of the x-rays to reduce x-ray absorption, resulting in the optical beam being a few degrees off from a true 180 degree backscattering geometry, which significantly reduces Compton backscattering efficiency.

Therefore, what is desired is a compact Compton x-ray source with increased brightness and efficiency that is suitable for narrowband synchrotron radiation applications.

SUMMARY OF THE INVENTION

A Compton backscattering x-ray source refreshes an orbiting electron bunch according to a schedule. In one embodiment, the orbiting electron bunch is refreshed sufficiently often to improve at least one attribute of x-rays generated by Compton backscattering compared with steady state operation. In one embodiment, the orbiting electron bunch is refreshed according to a schedule selected to improve x-ray brightness within a desired bandwidth.

One embodiment of a method for generating x-rays by Compton backscattering includes: guiding electron bunches in an orbit around an x-ray storage ring that includes an interaction point; providing photon pulses at the interaction point for Compton backscattering; and refreshing an orbiting electron bunch by injecting a new electron bunch and ejecting an old electron bunch according to a schedule selected to improve at least one attribute of x-rays generated by Compton backscattering.

One embodiment of an x-ray source generating x-rays from Compton backscattering includes: an electron storage ring for storing electron bunches, the electron storage ring guiding electrons in an orbit around the electron storage ring that passes through an interaction point disposed along a portion of the electron storage ring, electron bunches stored in the electron storage ring having at least one attribute related to the emission of x-rays that degrades after initial injection according to a time response; an injector for injecting electron bunches into the electron storage ring; an ejector for ejecting electron bunches from the electron storage ring; an optical system generating photon pulses coupled to the interaction point, the photon pulses synchronized to interact with corresponding electron bunches in the interaction region to generate x-ray radiation via Compton backscattering; and a timing system directing the injector and the ejector to eject a stored electron bunch and inject a new electron bunch according to a schedule selected to reduce the degradation of the at least one attribute related to the emission of x-rays compared with steady-state operation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
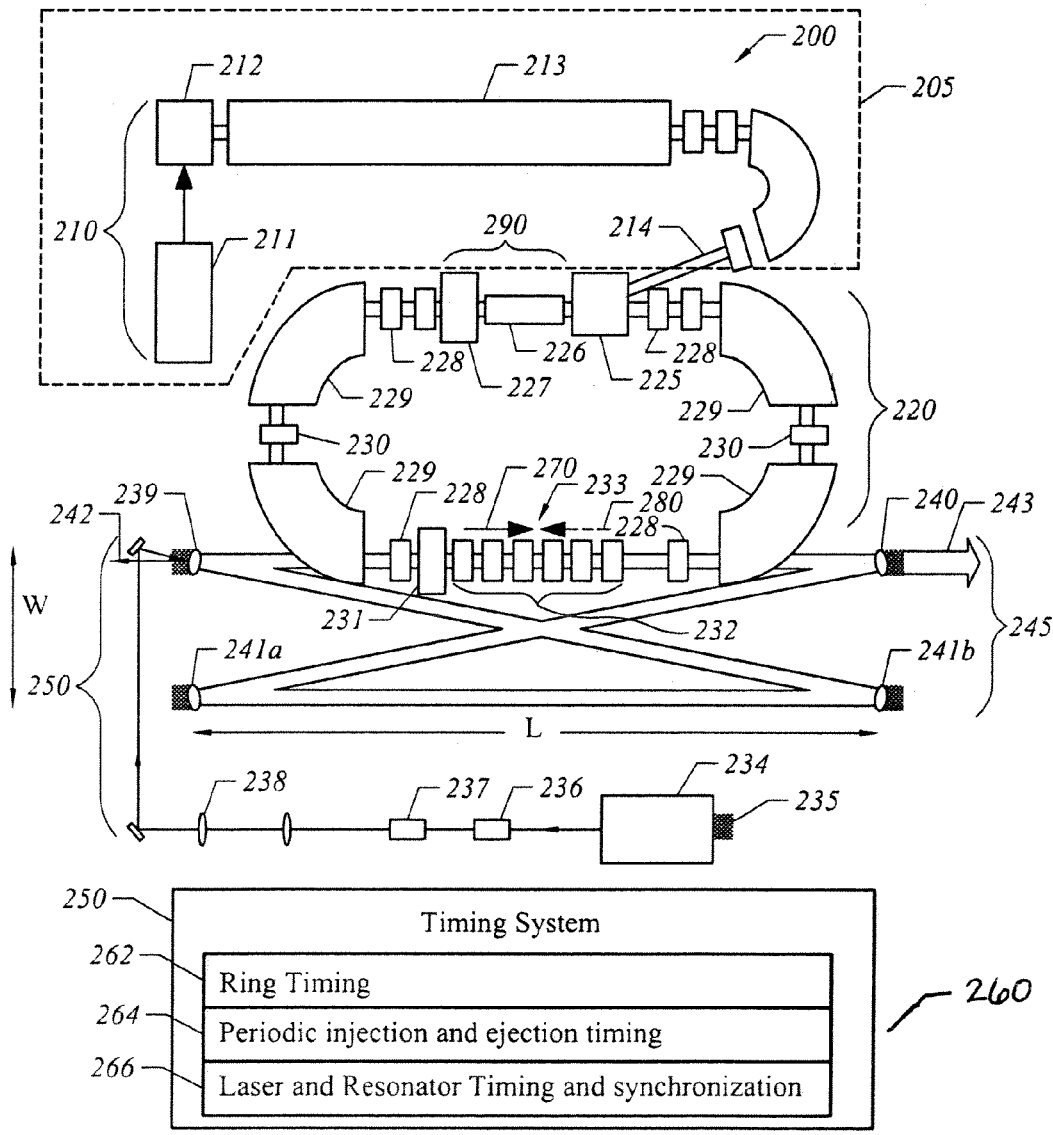
FIG. 2 is a block diagram of a Compton x-ray source in accordance with one embodiment of the present invention.

FIG. 2 illustrates a compact x-ray synchrotron source 200 having features facilitating the generation of nearly monochromatic, collimated, tunable, high-flux beam of x-rays suitable for many x-ray applications in accordance with one embodiment of the present invention.

X-ray synchrotron source 200 includes an injector 205 portion of the system having elements 211, 212, 213, and 214 for generating and injecting an electron bunch into an electron storage ring 220 via septum 225. An electron bunch is a group of electrons that, for example, has a spatial density envelope, energy and momentum distribution, and temporal pulse length. An electron source 210 produces an electron bunch using an RF gun 212 by striking a photocathode material, such as copper or magnesium, with a pulsed laser 211. A short linear accelerator section(s) 213 accelerates the electron beam to the full energy desired in the ring to obtain a desired x-ray energy for Compton scattering at approximately 180 degrees with photons having a selected wavelength. For example, the electron energy necessary for 1 Å radiation, using a 1 µm wavelength laser pulse, is 25 MeV. A transport line 214 consisting of focusing and steering magnets prepares the electron bunch for injection into the electron storage ring 220.

An injected electron bunch is steered using a septum magnet 225 near the closed orbit trajectory of the electron storage ring 220. The bunch trajectory is then aligned to the proper storage ring orbit by a fast deflector magnet (kicker) 226. In one embodiment kicker 226 uses a compact set of distributed deflector magnets to reduce the peak power, and hence complexity, of the drive electronics.

An ejector 290 portion of the system includes kicker 226 and shielded beam dump 227. Kicker 226 ejects an existing, circulating pulse to locally shielded beam dump 227. The locally shielded electron dump 227 provides a controlled means to minimize unwanted radiation emission. In one embodiment locally shielded electron dump 227 includes a collimator or aperture at the entrance of the dump to intercept an ejected electron bunch. Each dump (ejection) of an electron bunch generates radiation that, if unshielded, would raise background radiation levels in the region around x-ray synchrotron source 200. Radiation shielding (not shown) associated with locally shielded electron dump 227 is sized and located to reduce background radiation levels. As described below in more detail, septum 225, kicker 226, and shielded beam dump 227 are preferably designed to permit a mode of operation in which the electron bunch is regularly (e.g., periodically) refreshed (e.g., simultaneous injection of a new electron bunch and ejection of an old electron bunch) in order to reduce the time-averaged energy and momentum spread of the electron bunch compared with steady-state operation. Localized radiation shielding of shielded beam dump 227 is thus desirable to facilitate regular refreshment of the electron bunch while maintaining acceptable average background radiation levels.

The electron storage ring 220 includes focusing and steering elements for guiding and maintaining an electron bunch in a stable, closed orbit. A magnet lattice composed of quadrupole focusing magnets 228 and dipole bending magnets 229 contain and steer the beam in a closed-loop orbit. The dipole magnets, together with intervening quadrupole magnet(s) 230 may form achromatic optical systems to facilitate injection and beam optics matching.

The beam is kept tightly bunched by an RF cavity 231. On one side of the ring is a straight section in which the electron beam is transversely focused to a small spot by a set of quadrupole magnets 232. This small spot is called the interaction point (IP) 233 (also sometimes known as the "interaction region") and is coincident with the path of a focused laser pulse created by optics system 250. The beam dynamics of the electron bunches are preferably optimized to achieve a stable orbit with acceptable degradation. Beam position monitors may be included to monitor the beam trajectory of electron bunches along the ring.

Optics system 250 generates photons that collide with electrons in the interaction point 233. In one embodiment, photons collide with electrons in a 180 degree backscattering geometry. A pulsed laser source 234 drives an optical resonator 245 formed by the optical cavity associated with mirrors 239, 240, 241a, and 241b. The optical resonator 245 has an optical path between mirrors 242 and 240 that is coaxial with a portion of the storage ring 220 through the interaction point 233. The pulsed laser source 234 includes elements needed to condition the laser for coupling power efficiently to optical resonator 245. A feedback system may consist of a local controller 235, such as a high bandwidth piezo-electric mirror assembly, to track the laser frequency to that of the optical resonator 245. Such systems may use an optical modulator 236 to implement a frequency discrimination technique that produces an appropriate error signal from a reflected signal 242.

An input mirror 239 is made purposely transmissive to enable optical power to enter the cavity from the drive laser 234. The input transmission value should be ideally matched to the total internal cavity losses in order to efficiently couple power (impedance matched). The cavity mirrors are curved with values appropriate to produce a small spot of similar size to the focused electron beam at the IP 233.

The optical resonator 245 may be a conventional cavity, such as a Fabry-Perot cavity. However, in one embodiment the optical resonator 245 is a ring cavity. Additional optical elements (not shown) may be used to adjust the position of one or more of the mirrors 242, 240, 241a, and 241b.

In one embodiment mirrors 239, 240, 241a, 241b are configured to form a 'bowtie' ring cavity as shown. The bowtie configuration is a traveling wave ring, which has increased stability over a standing wave Fabry-Perot optical cavity. Note that in a bowtie configuration that there are two (phase/time shifted) pulses that are simultaneously circulated in resonator 245. If a bowtie configuration is used, x-ray system 200 is preferably designed to synchronize the collision of each of the two circulating phase/time shifted photon pulses with the electron bunch.

An optical resonator 245 including a bowtie ring cavity affords several advantages. The geometry of a bowtie cavity permits a long separation, L, between mirrors 239, 240 within a reasonable total area. This is due, in part, to the fact that the bowtie configuration permits the width, W, between mirrors 239 and 241a to be less than the length, L, separating mirrors 239 and 240, particularly if the angular deflection provided by each mirror is selected to be comparatively small. A long separation, L, facilitates shaping photon pulses to have a narrow waist near IP 233 that increases at mirrors 239 and 240. The long separation, L, facilitates selecting the optical elements to form a narrow optical waist at interaction point 233 where the opposing electron beam is likewise transversely focused. Additionally, because the two mirrors 239, 240 on each side of the waist can be separated by a large distance, L, in a bowtie configuration, the bowtie configuration permits a substantial increase in the beam size on these mirrors that in turn lowers the optical power per unit area or risk of damage. That is, a long distance between mirrors 239, 240 permits a narrow optical waist at interaction point 233 and a comparatively wide optical profile at mirrors 239, 240. In one embodiment, the ratio of transverse beam size between the mirrors and the waist is approximately 100:1 which leads to a reduction in power density at mirrors 239, 240 on the order of 10000:1 for an axially symmetric TEM00 mode. Since one limiting factor on the circulating power in optical resonator 245 is mirror damage, the reduction in power levels at the mirror facilitates storing a high optical power level within optical resonator 245.

A large distance between mirrors 239, 240 is also advantageous to steer an electron beam in to and out of the IP using dipole magnets 229 such that the collision may occur at an optimal 180 degree backscattered geometry. A very small or zero crossing angle between electron and photon pulses maintains a high interaction efficiency yet allows the pulses to remain relatively long for improved stability. A natural consequence of this 180 degree backscattering geometry is that generated x-rays will follow a path coincident with the electron path trajectory at the IP 233 and consequently be directed toward and through one optical mirror 240.

Using high-quality spherical mirrors in such geometries may require a local controller (not shown) to adjust astigmatism on a subset of mirrors to guarantee small interaction spots in both transverse dimensions at the IP 233. Another local control on the overall cavity length, for instance with a set of piezo-electric elements on one mirror (not shown), is required to set the cavity round-trip time (or path length) to be harmonically related to the round-trip time (path length) of the electrons in the ring in order to properly synchronize collisions.

A polarization controller 237 may be included to rapidly change the optical polarization properties of the optical pulse, which in turn affects the polarization of generated x-rays. Such a controller may be implemented using an electrical Pockels cell or mechanically controlled waveplates.

Matching optics 238 manipulate the transverse mode profile to match the eigenmode of the cavity. Flat turn mirrors may also be included to align the incident beam to the optical cavity axis. The matching optics are illustrated as transmissive lenses, although for high power applications, using all reflective optics may be preferred to preserve optical mode quality.

In one embodiment optical resonator 245 is a high-finesse cavity and pulsed laser source 234 is a frequency stabilized mode-locked laser that resonantly drives the high-finesse cavity of optical resonator 245. In one embodiment the pulsed laser source 234 is a mode locked laser that is actively stabilized to efficiently drive a high-finesse external resonator 245. The mode-locked laser system resonantly drives the enhancement cavity to build-up a high power laser pulse. The laser tracks the resonance of the optical cavity through active feedback, such as deriving an error signal by measuring the phase of the prompt reflection to that of some small leaked cavity power 242. A photodiode or other high bandwidth detector (not shown) may be used on the reflected signal 242 from the cavity for feedback or wavefront diagnostics.

An optical resonator 245 formed from a high finesse cavity is capable of storing large photon densities. The optical cavity gain and power storage performance has an intrinsic limit given by the total losses of the cavity and mirror power handling. Advances in optical coatings have pushed mirror scatter and absorption losses down to part per million levels. These low losses together with higher surface damage thresholds are compatible with an average circulating power on the order of a Megawatt or more using commercially available solid-state laser power. However, a high finesse cavity has a narrow bandwidth, which means that high optical power levels within a high finesse cavity can only be efficiently achieved if pulsed laser source 234 is a frequency stabilized laser source, such as a mode-locked laser, with a narrow, controlled bandwidth that is matched to the high finesse cavity. As one example, the combination of a frequency stabilized mode locked laser and a high finesse cavity permits a pulsed gain enhancement in excess of 10,000, which reduces the laser source complexity and cost needed for a Compton scattering x-ray source due to the increase in optical power level.

Figure 1:
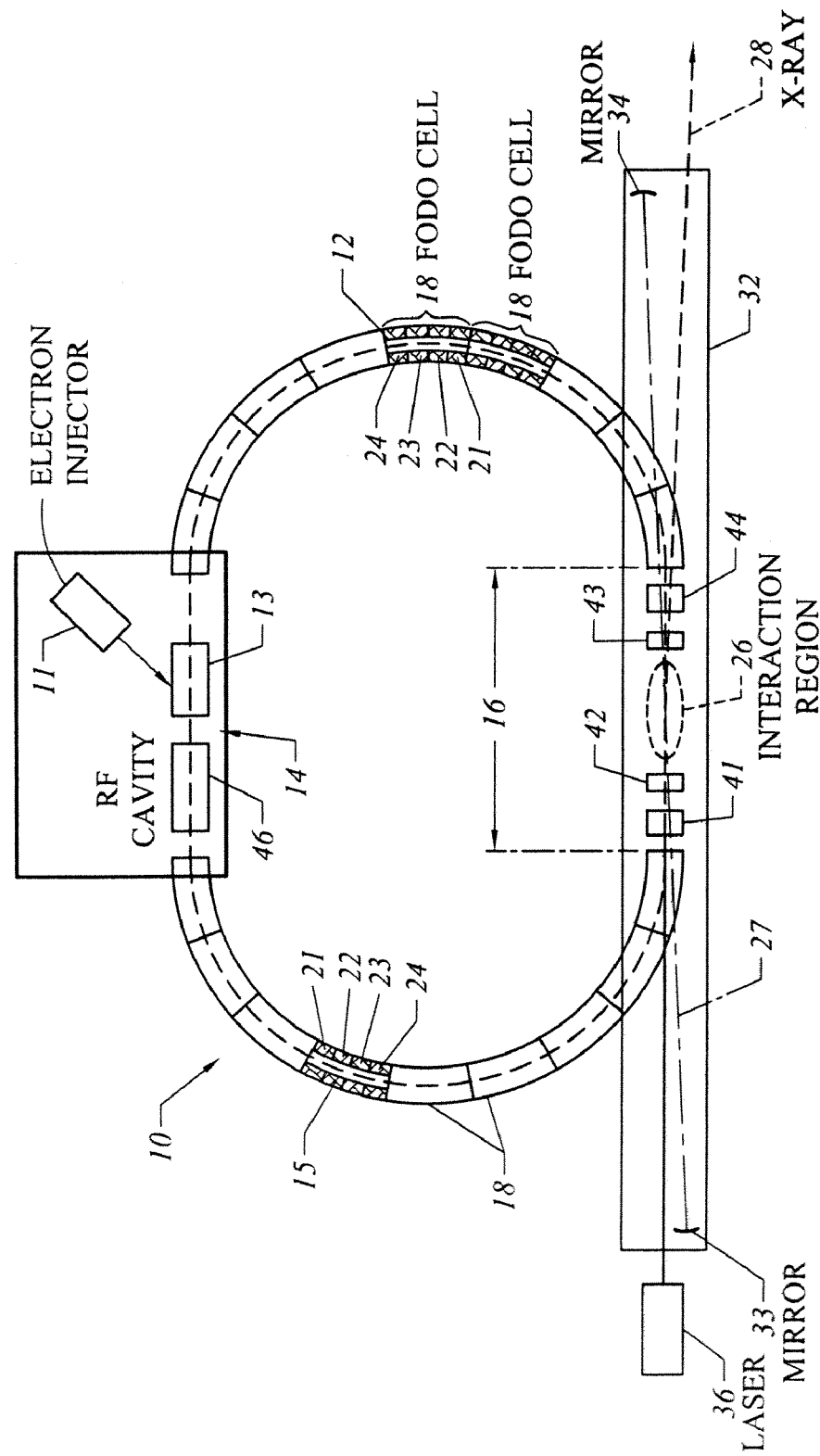
FIG. 1 is a block diagram of a prior art Compton x-ray source.

In the backscattering geometry illustrated in FIG. 2 an electron bunch 270 and a photon pulse 280 interact at interaction point 233 and generate x-rays 243 that pass through mirror 240. The efficiency of the Compton backscattering process is improved for a true 180 degree backscattering process compared with the off-axis geometry illustrated in prior art FIG. 1. However, a conventional laser mirror 240 adds a substantial x-ray attenuation. A 180 degree backscattering geometry thus provides a net increase in x-ray brightness only if the x-ray attenuation of mirror 240 is sufficiently low. Optical mirror 240 is thus preferably low loss for photon pulses and also transmissive for x-rays. For example, mirror 240 may be a high quality optical mirror formed from a multi-layer dielectric reflective stack deposited on a substrate. The dielectric layers and the substrate are preferably selected to transmit, with little attenuation, hard x-rays with energies $\geq 5$ keV. For example, optical mirrors made from Tantalum ($Ta_2O_5/SiO_2$) or Zirconium ($ZrO_2/SiO_2$) dielectric layers contain absorption energies in the hard x-ray spectrum although the overall attenuation due to the coatings should preferably not exceed 10% for multi-layer stack mirrors. A preferred combination of dielectric coating materials for a dielectric stack is alternating layers of Titania/Silica ($TiO_2/SiO_2$). The K-edge is at 5 keV, which makes the x-ray transmission efficient for ~7 keV and higher x-ray energies. Another possible combination of dielectric materials for >1 μm wave-length is Silicon/Silica ($Si/SiO_2$). Exemplary substrate materials include Beryllium, Silicon, and Sapphire. Another possible substrate is to coat a super-polishable (~1 Å rms) substrate, preferably Silicon. with CVD diamond to improve mechanical rigidity and thermal conductivity.

A timing system 260 synchronizes the timing of different components. Ring timing 262 generates signals for controlling the ring orbit frequency for electron bunches. Injection and ejection timing 264 generates signals for controlling the injection of new electron bunches and the simultaneous ejection of old electron bunches. The refreshment of the electron bunches is preferably performed periodically according to a selected period (e.g., at a rate of 10-200 Hz). Periodic refreshment has the benefit over other scheduling protocols that it facilitates synchronization. However, it will be understood that injection and ejection timing 264 may define a refreshment schedule other than that of a fixed period. Laser and resonator timing synchronization 266 generates timing signals for synchronizing optical system 250 to the electron bunches.

Figure 3:
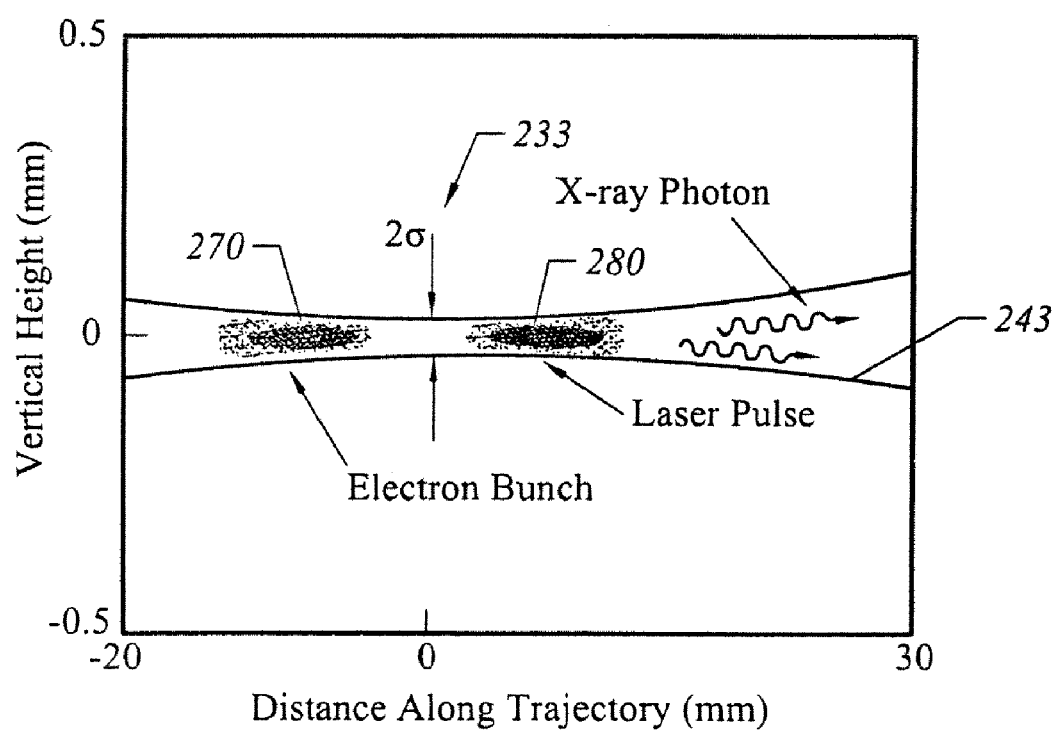
FIG. 3 illustrates the electron-photon interaction at the interaction point.

FIG. 3 illustrates the backscatter geometry near the interaction point 233. The electron bunch 270 and the laser (photon) pulse 280 have a vertical height (i.e., radial profile) across the length of an electron bunch 270. Focusing elements within storage ring 220 focus the electron bunch 270 whereas optical elements focus the laser pulse 280. At the interaction point 233 the electron bunch and the laser pulse preferably have a similar radial waist radius, a, although to generate particular x-ray beam qualities the beam waists may be selected to be purposely different. The electron bunch 270 and the laser pulse 280 travel in opposite directions towards the interaction point 233 and produce a burst of x-rays 243 as their envelopes pass through each other. Fundamental principles of electron focusing and optical focusing may be used to calculate the three-dimensional profile of the electron bunch 270 and the laser pulse 280. The electron bunch and the laser pulse are preferably formed and focused to have similar profiles and temporal lengths selected to optimize Compton backscattering. Note that the radial diameter of an electron bunch or a photon pulse increases along its length due to fundamental principles of electron and optical focusing. Generally, increasing the temporal length of an electron bunch or a photon pulse increases the radial spread. A substantial increase in radial diameter can reduce the average brightness of the x-ray source. As described below in more detail, it is desirable to select the temporal length of the electron bunch and the laser pulse such that each pulse length results in expansion that is less than the Rayleigh range, or depth of focus.

The repetition rate for collisions is determined by the ring geometry. For example, a 4 meter circumference would give an interaction rate of 75 MHz corresponding to the inverse of the time it takes for an electron bunch to make one revolution around the ring. The x-rays are directed in a narrow cone in the direction of the electron beam. They can be focused using conventional x-ray optics down to the source image size, for instance ~60 μm diameter. Gross x-ray energy can be tuned by adjusting the electron beam energy, and fine-tuning can be accomplished by a monochromator crystal or filter adjustment.

The general configuration as described above operates with a similar photon flux up to x-ray energies of many tens of kV, and can be scaled to gamma ray energies as well.

As previously described, in one embodiment the injector 205 and ejector 290 regularly refreshes the electron bunch in the storage ring to improve the beam quality. For example, in a periodic refreshment process, after an electron bunch has completed a pre-selected number of trips around the ring (e.g., one million turns) the "old" electron bunch is ejected and a "new" electron bunch is injected to take its place. In the example of a system having an interaction rate of 75 MHz, refreshing at a rate of 60 Hz would permit each electron bunch to make 1.25 million turns before being ejected. Note that this mode of operation is in contrast to conventional synchrotron operation in which the synchrotron is traditionally operated in a steady-state mode as long as practical for beam stability and other considerations.

Figure 4A:
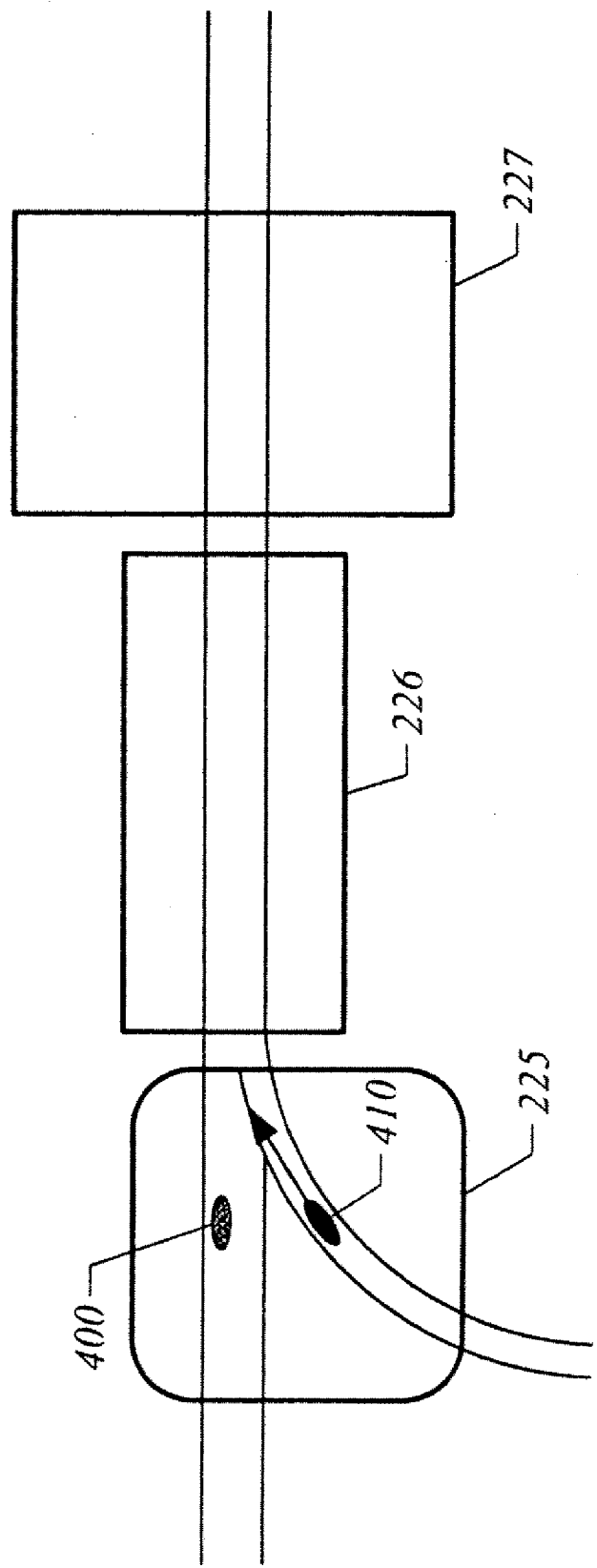
FIG. 4A illustrates a portion of an ejection/injection cycle in which a new electron bunch is injected.
Figure 4B:
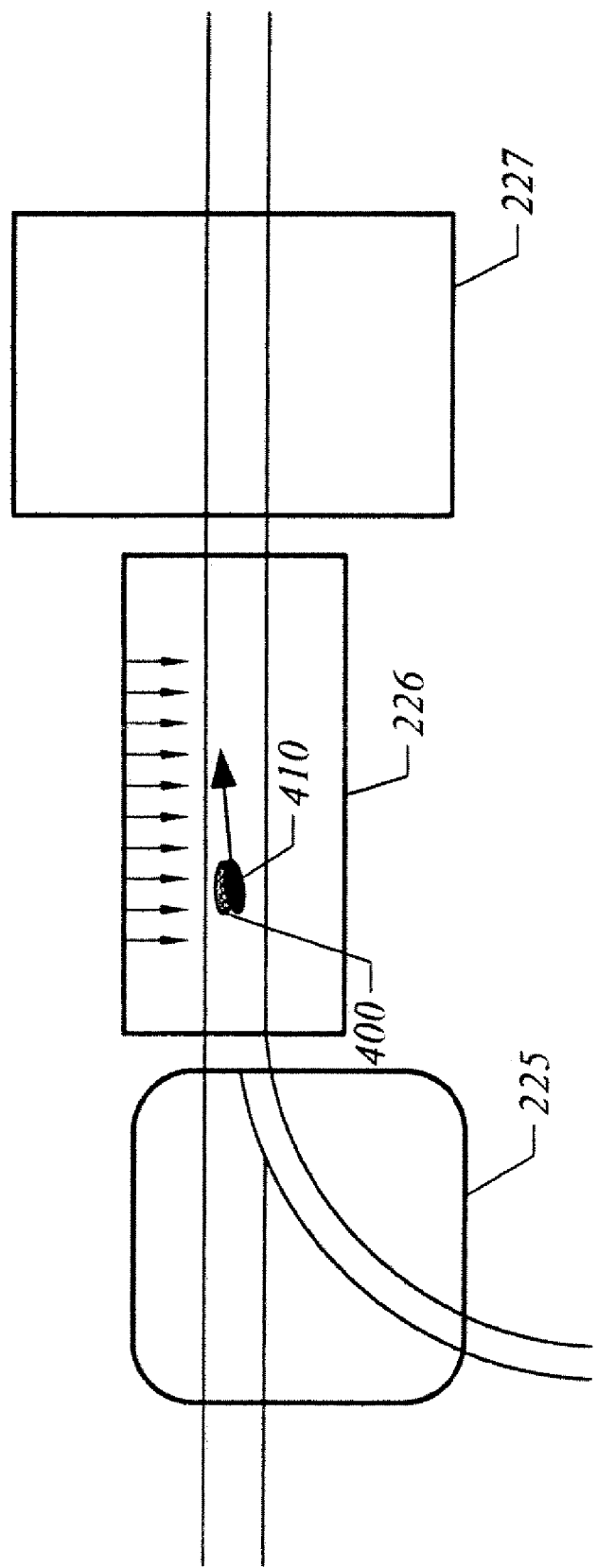
FIG. 4B illustrates a portion of an ejection/injection cycle in which the new electron bunch and the old electron bunch are being deflected by the kicker.
Figure 4C:
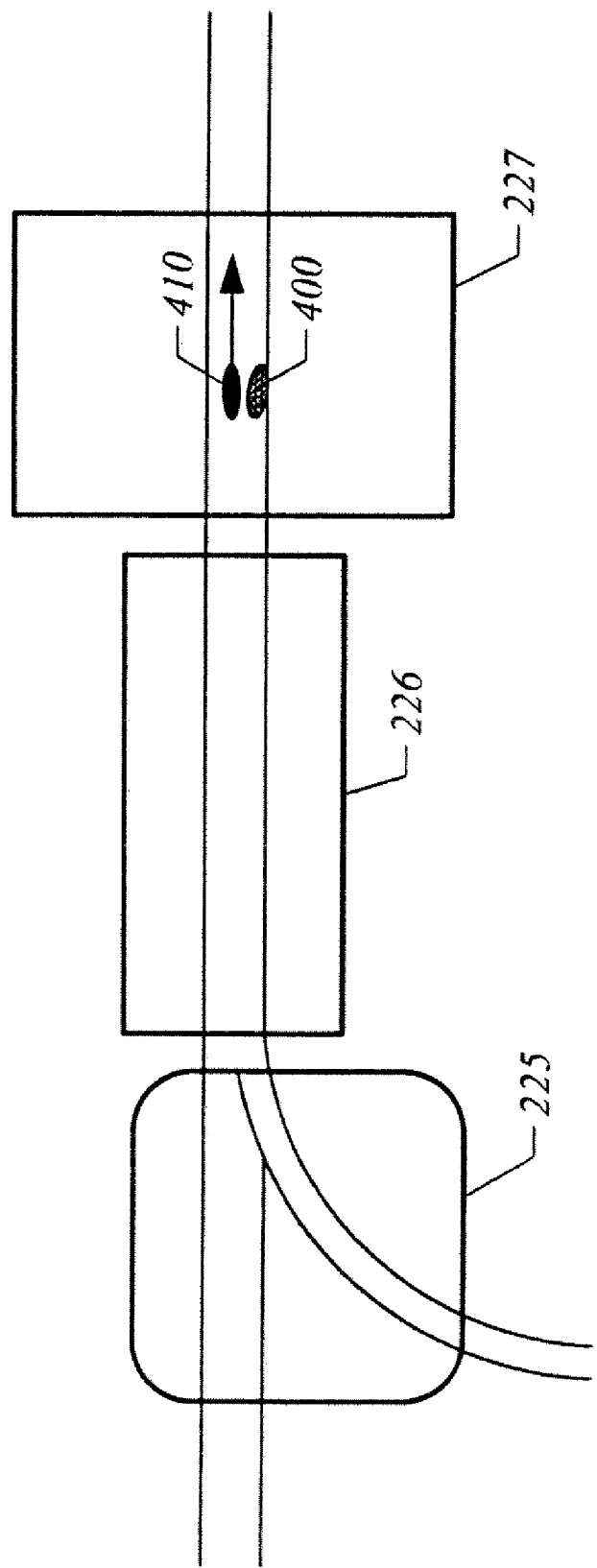
FIG. 4C illustrates a portion of an ejection/injection cycle in which the old electron bunch has been dumped and the new injection bunch has been directed into an orbit in the electron storage ring to replace the old electron bunch.

FIGS. 4A-4C illustrate aspects of a refreshment process in which an old electron bunch is ejected while a new electron bunch is simultaneously injected. Referring to FIG. 4A, an electron bunch 400 that has completed a pre-selected number of turns enters septum 225. A new electron bunch 410 is synchronized to enter kicker 226 at a time selected such that the new electron bunch 410 will replace the old electron bunch 400. Referring to FIG. 4B, kicker 226 is turned on during the refresh process to apply a magnetic field that shifts the path of an electron bunch within kicker 226. Note that the two electron bunches 400 and 410 have slightly different initial trajectories. Both the old electron bunch 400 and the new electron bunch 41 0 are spatially shifted by the magnetic field applied by kicker 226. Referring to FIG. 4C, kicker 226 applies a sufficient magnetic field to shift new electron bunch 410 into a proper trajectory to enter a stable orbit in electron storage ring 220 as the new stored electron bunch. Conversely, old electron bunch 400 has its trajectory shifted to exit the electron storage ring 220 in dump 227. Kicker 226 is then turned off until the next refresh cycle.

When a new electron bunch 410 is first injected into the electron storage ring 220, it has a comparatively narrow energy and momentum spread and can be tightly focused. However, with each subsequent revolution around the ring attributes of the electron bunch affecting x-ray emission degrade according to a time response. In particular, the energy and momentum of the electron bunch may increase to equilibrium levels for times greater than a degradation time (e.g., a degradation time may correspond to an exponential time constant to approach $e^{-1}$ of a final saturation value) For example, the time response for intra-beam scattering (with radiation damping) is a response in which the intra-beam scattering begins at some initial rate of increase with the rate of increase exponentially decaying over time until the intra-beam scattering reaches a saturation level for time periods sufficiently long, e.g., for times greater than some saturation time constant. Additionally, any other degradation mode that may exist in the system would be expected to have its own associated time response and degradation time constantly However, in many applications, intra-beam scattering is expected to be the dominant degradation mechanism. Intra-beam electron beam scattering increases with each revolution and eventually reaches a saturation level through photon cooling (e.g., radiation damping) over a time scale that is commonly on the order of a fraction of a second, as described in more detail in R. J. Loewen. *A Compact Light Source: Design and Technical Feasibility Study of a Laser-Electron Storage Ring X-Ray Source*. PhD thesis, Stanford University, Stanford, Calif., June 2003, the entire contents of which are hereby incorporated by reference.

Intrabeam scattering increases the transverse emittance (the product of the spot size and e angular divergence) and also the longitudinal emittance (the product of the bunch length and energy spread). An increase in transverse emittance is undesirable because an increased transverse emittance reduces the x-ray brightness. This is because the inverse emittance is inversely proportional to the output x-ray quality or brightness, where the brightness can be expressed mathematically in terms of photons, area, solid angle (solidangle), and bandwidth as brightness=photons/(area*solidangle*bandwidth). An increase in longitudinal emittance (energy spread) increases the bandwidth of the x-rays, which is undesirable for narrowband applications because it means that the usable flux within a desired "monochromatic" bandwidth is decreased. As an illustrative example, in the prior art system of FIG. 1, the equilibrium value of intra-beam scattering and quantum excitation lead to an order of magnitude increase in energy spread, and commensurate reduction in brightness, from the initial injected electron beam parameters.

Selecting the refresh rate to increase x-ray brightness involves a tradeoff between several different considerations. The upper limit on refresh rate is limited by system considerations such as electron bunch injection power, design complexity, synchronization issues, and shielding concerns (since each beam dump will generate undesirable radiation). The lower limit on refresh rate is bounded by the desire to operate in a transient mode in which time-averaged x-ray brightness (within a selected bandwidth) is improved compared with steady state operation. In particular, the minimum refresh rate may be selected such that the period of the rate is less than the time for the electron bunch to degrade to a steady-state saturation level. For example, the minimum refresh rate may be selected to be less than a degradation time constant for degrading to the steady state. As a result, the time-averaged electron bunch attributes improve, resulting in a corresponding improvement in the time-averaged x-ray attributes.

As an illustrative example, for a particular application the minimum refresh rate may be selected to achieve a desired increase in the level of x-ray brightness within a desired bandwidth compared with operating in steady-state. As one example, a simulation by one of the inventors of the present application indicates that the energy and momentum of an electron bunch may approximately double over a time scale of 0.01 seconds. Over a longer period of time (e.g., a significant fraction of a second), steady state is reached with a decrease in brightness of about an order of magnitude. Thus, in one embodiment the refresh rate is selected to maintain the degradation below a pre-selected level, such as a factor of two or three increase in degradation. Consequently, periodically refreshing the electron bunch at a fraction of the dominant time constant, such as at rates greater than about 10 Hz (e.g., 10-200 Hz) is sufficient to operate in a transient (non-steady state) mode that improves x-ray brightness and reduces the bandwidth of the x-rays. Thus, in this illustrative example it can be understood that dramatic increases in brightness can be achieved by periodically refreshing the electron bunch. Although the improvement in brightness is usefull for a variety of applications, the corresponding reduction in bandwidth of emitted x-rays also makes periodic refreshment of particular interest for narrowband synchrotron x-ray application where the x-ray source must have a high flux within a comparatively narrow bandwidth.

While the electron bunch may be refreshed at a fixed rate, more generally the electron bunch may be refreshed according to a schedule. For example, the schedule may include a fixed rate of refreshment, a variable rate of refreshment, an adjustable rate of refreshment, or other scheduling schemes. However, in many applications a fixed refresh rate is the simplest schedule to implement using commercially available electronics.

Regularly refreshing the electron bunch also provides other benefits to system design of a compact Compton x-ray source. In particular, the number of components is reduced compared with a steady-state design. For example, a steady-state design conventionally includes components to stabilize the beam over long time periods (e.g., hours or days), which increases the number of components that are required. For example, a conventional compact Compton x-ray source designed to operate in steady state for extended time periods must include components to stabilize the large equilibrium energy spread of the beam, such as through chromaticity correction or a low momentum compaction lattice.

Figure 5A:
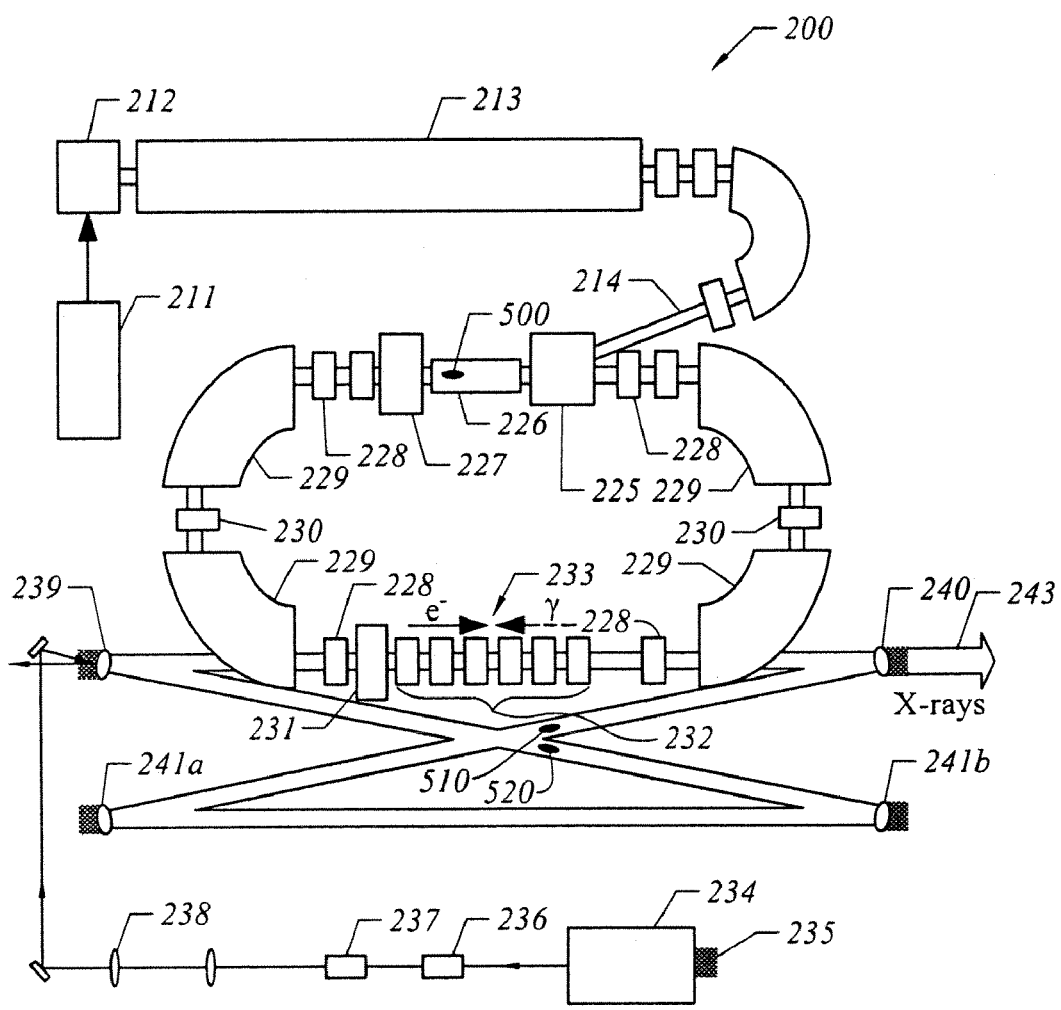
FIG. 5A illustrates the location of the electron bunch and the photon pulse at a first time.
Figure 5B:
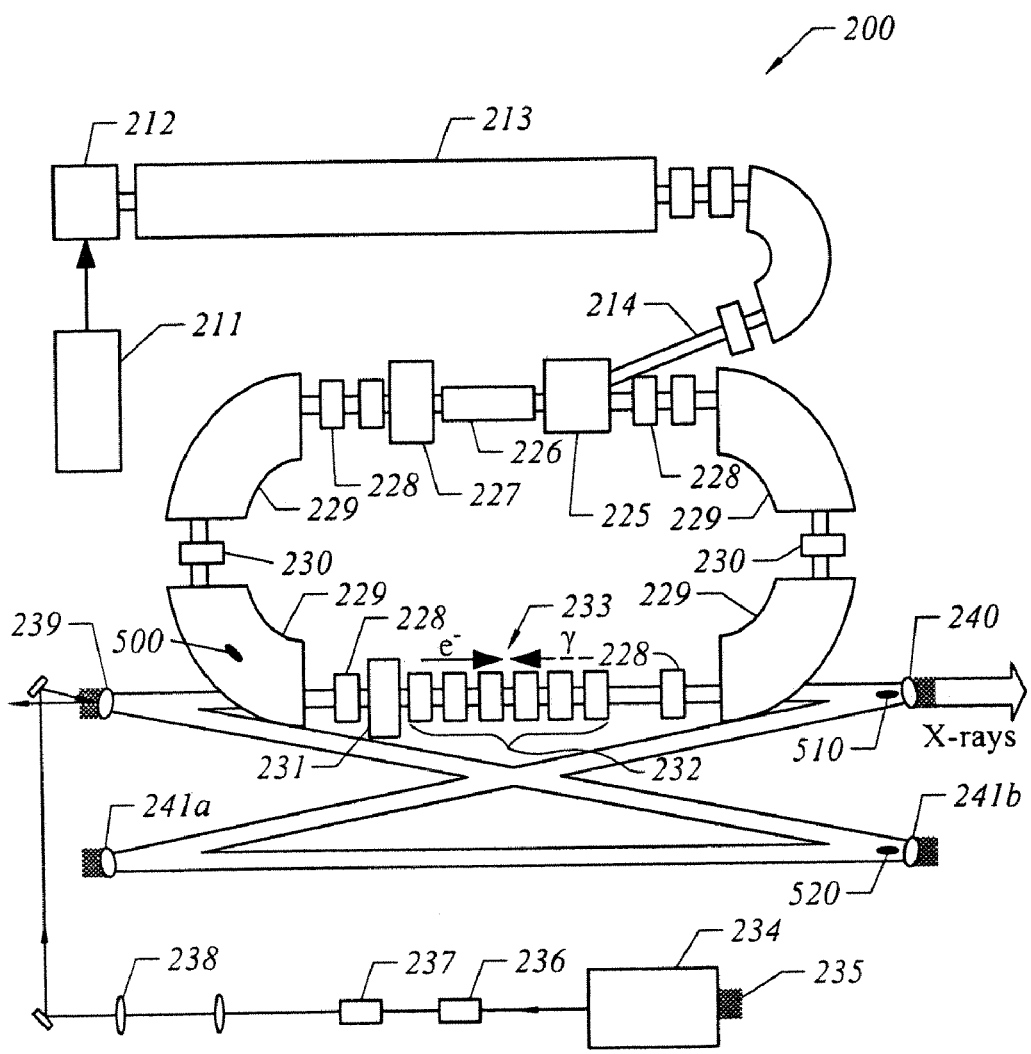
FIG. 5B illustrates the location of the electron bunch and the photon pulse at a second time.
Figure 5C:
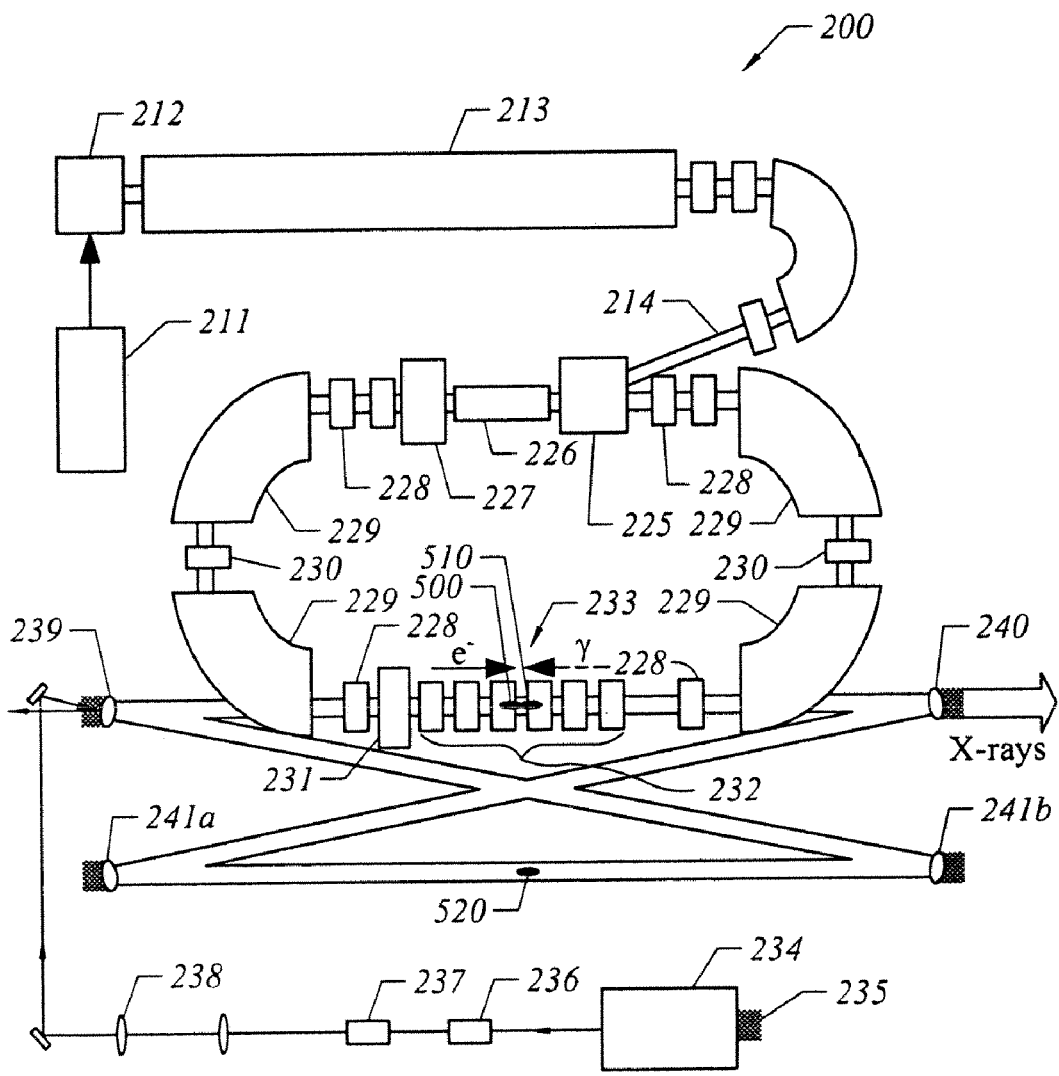
FIG. 5C illustrates the location of the electron bunch and the photon pulse at a third time.

FIGS. 5A-5C are illustrations at three different times illustrating how the electron bunch and optical pulse are timed to meet at the IP 233. As shown in FIG. 5A, at some initial time, an electron bunch 500 traverses the kicker 226. In the optical cavity, a first optical pulse 510 is directed towards mirror 240. A second optical pulse 520 is directed towards mirror 241b. As shown in FIG. 5B, at a second time, the electron bunch 500 has moved partially towards the IP while the first optical pulse 510 strikes mirror 240 and the second optical pulse 520 strikes mirror 241b. As illustrated in FIG. 5C, at a third time, the electron bunch 500 and optical pulse 510 are directed in opposite directions and interact at the IP 233.

Referring again to FIG. 2, in one embodiment timing system 260 adjusts ring timing 262, periodic injection and ejection timing 264, and laser and resonator timing and synchronization 266. A preferred embodiment employs a set of master frequency sources that are phase-locked to high precision and distributed to the device subsystems, thus circumventing complicated or costly timing feedback systems. In one embodiment, an integrated master frequency generator internally phase locks to each of the required frequencies using phase locked coaxial resonator oscillators. In one embodiment a base frequency $F1$ (~100 MHz) represents the electron ring circulation time and interaction rate. An RF frequency at some multiple of that rate $F2=n*F1$ (e.g. n=16) is fed to one or more RF cavities in the electron storage ring 220 to stabilize longitudinal dynamics. Furthermore, another harmonic multiple of the ring frequency $F3=m*F1$ (e.g. m=30) may be used to power the RF gun 212 and accelerating structures. The particular choice of frequencies depends on source costs and desired beam parameters. In one embodiment a high-power S-band (~3 GHz) pulsed microwave source is used to power the injector system, and then derive suitable ring circulation frequencies from sub-harmonics.

Timing system 260 coordinates the electron bunch injection and ejection cycles to maintain electron bunches in the storage ring within acceptable design parameters for absolute timing, energy spread and bunch length. The injection/ejection cycle is preferably performed at some integer multiple of the AC line frequency in order to reduce pulse-to-pulse timing (phase) jitter generated from high power RF systems. These timing pulses are generated, for example, from a fast 60 Hz zero-crossing detector logically 'AND'ed with the desired ring circulation frequency $F1$. The pulsed injector system may, for example, operate in the 10-200 Hz frequency range ("re-injection" rate).

The photocathode of RF gun 212 requires phase stability between the RF powering the device ($F3$) and the timing or phase of the incident laser 211 used to create the electron bunch ($F1$). Laser pulses derived from a mode-locked laser 234 are stabilized at $F1$ using a phase-locked loop. One of these pulses is selected to seed an amplifier (not shown) that then delivers a frequency-converted (UV) laser pulse to the photocathode at the proper RF phase ($F3$). A phase shifter in an RF line tunes the relative phase offset.

The timing system 260 may also generate all sample clocks required by real-time servo controls in the optical resonator 245, including optical cavity length and alignment control systems for proper phasing or synchronization between the electron and photon pulses to assure optimal collision efficiency at the interaction point (IP). The highest sampling rate for feedback loops is determined by the ring frequency (~100 MHz). However, by individually stabilizing both the electron ring circulation and the optical cavity length from one master frequency source, $F1$, only phase drifts need to be adjusted once the proper relative phase is set.

Selection of the pulse length of the electron bunches and photon pulses involves several tradeoffs. Selecting extremely short pulses (e.g., less than one picosecond pulses) facilitates obtaining tight focus of electron bunches and photon pulses and results in the highest peak x-ray output. However, the use of extremely short pulses has the drawback that timing synchronization and control is difficult to achieve using commercially available electronics. Pulse lengths less than about one picosecond require specialized, ultrafast electronics to achieve sub-picosecond synchronization and phasing. Additionally, jitter is a problem when the pulse lengths are less than about one picosecond. In particular, it is difficult to maintain a jitter budget of less than about one picosecond for many commercially available electronic and optical components.

In one embodiment, the electron bunches and photon pulses have pulse lengths from about one picosecond to several tens-of-picoseconds. Using tens-of-picosecond-long electron bunches and photon pulses relaxes the required timing synchronization to similar levels. The absolute timing or phase correction, arising from thermal or mechanical drifts, requires only a slow feedback loop and may be optimized by monitoring x-ray flux. More importantly, longer electron pulses reduce the peak current of the beam which helps reduce the onset of instabilities or other beam dynamics that degrade electron beam quality. The use of longer optical pulses also optimizes storing high power in the high-gain optical cavity by reducing the effect of dispersion (carrier envelope offset) between the mode-locked laser and cavity modes.

The upper limit on the pulse lengths is limited by depth of focus issues, which can reduce the average x-ray flux if the pulse lengths are selected to be greater than several tens of picoseconds. The x-ray flux for a 180 degree backscatter geometry is only weakly sensitive to the length of the electron bunches as long as they are some fraction of the depth of focus, or Rayleigh range. The reduction in intensity is due to the "hourglass effect" which begins to dramatically reduce effective luminosity at bunch lengths beyond the depth of focus. A similar hourglass effect occurs for the photon pulses. The hourglass effect is illustrated in FIG. 3. There are practical limits to the achievable minimum waist sizes for both the electron beam and optical beam. For the electron beam, smaller than 30 micron waists require stronger and more complicated magnets (and more room to put them) that also lead to stronger chromatic effects that affect beam stability. Achieving under 20 micron waists is extremely difficult. For the optical beam, a small waist in a resonant cavity implies working close to an instability point. For practical and achievable waists, the corresponding depth of focus is typically many millimeters long. For a 1 micron laser and a focus of 30 microns (rms), the Rayleigh range is typically about 10 mm, which corresponds to approximately 30 picosecond long laser pulses and electron bunches.

In one embodiment, jitter timing budgets are also selected to facilitate recovering optimum electron bunch and photon pulse timing after each refreshment of the electron bunch. Returning again to FIGS. 4A-4C, in the ideal case the new electron bunch 410 would exactly replace the old electron bunch 400 with no change in timing that would reduce the Compton backscattering efficiency at IP 233. However, in a practical system the new electron bunch 410 replaces the old electron bunch 400 nearly synchronously, i.e., within a jitter timing budget that is preferably small enough that jitter in the timing of the electron bunch created by the refreshment process will not deleteriously disrupt the operation of the timing system 260. In particular, it is desirable that the jitter timing budget is small enough that timing system 260 does not have to perform a radical resynchronization of the photon pulse timing after each refreshment of the electron bunch. As an illustrative example, the jitter timing budget may be selected to be less than the temporal length of an electron bunch to reduce the complexity and cost of designing a control system to rapidly recover optimum electron bunch and photon pulse timing after a refreshment of the electron bunch.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system for generating x-rays by Compton backscattering, comprising:
an electron storage ring configured to guide and maintain an electron bunch injected into said electron storage ring in a stable and closed orbit that circulates through an interaction point disposed along a portion of said electron storage ring, each newly injected electron bunch having at least one attribute related to the emission of x-rays by Compton backscattering that degrades over time after initial injection;
an optical system generating photon pulses coupled to said interaction point, said photon pulses synchronized to interact with corresponding electron bunches at said interaction point to generate x-ray radiation via Compton backscattering; and
the system configured to synchronously replace a circulating electron bunch with a fresh electron bunch according to a schedule so that the electron storage ring nearly continuously stores an electron bunch available for Compton backscattering with the schedule being selected to improve x-ray output characteristics of the system by reducing the degradation over time of said at least one attribute related to the emission of x-rays by Compton backscattering.

2. The system of claim 1, wherein said system includes a deflector to adjust the orbit of electron bunches in a portion of the electron storage ring and an injector injecting a new electron bunch into an initial trajectory close to said stable and closed orbit, said fast deflector being triggered to spatially shift the fresh electron bunch onto the stable and closed orbit in said electron storage ring and simultaneously eject the circulating electron bunch.

3. The system of claim 1, wherein the schedule is selected to replace electron bunches at a rate that is at least about 10 Hz.

4. The system of claim 1, wherein the schedule is selected to increase x-ray brightness compared with operation without replacement.

5. The system of claim 1, wherein the schedule is selected to improve x-ray flux within a selected x-ray bandwidth compared with operation without replacement.

6. A system for generating x-rays by Compton backscattering, comprising:
an electron storage ring configured to guide and maintain an electron bunch injected into said electron storage ring in a stable and closed orbit that circulates through an interaction point disposed along a portion of said electron storage ring, each newly injected electron bunch having at least one attribute related to the emission of x-rays by Compton backscattering that degrades over time after initial injection;
an injector for producing, accelerating, and guiding electron bunches to said electron storage ring;
a septum to guide a new injected electron bunch onto an initial trajectory near to the stable and closed orbit of said electron storage ring;
a fast deflector to deflect a new electron bunch from the initial trajectory onto the stable and closed orbit of the electron storage ring and deflect an old electron bunch out of the stable and closed orbit;
an optical system generating photon pulses coupled to said interaction point, said photon pulses synchronized to interact with corresponding electron bunches at said interaction point to generate x-ray radiation via Compton backscattering; and
a timing system directing said injector and said fast deflector to synchronously replace a circulating electron bunch with a fresh electron bunch according to a schedule so that the electron storage ring nearly continuously stores an electron bunch available for Compton backscattering with the schedule being selected to improve x-ray output characteristics of the system by reducing the degradation over time of said at least one attribute related to the emission of x-rays by Compton backscattering.

7. The system of claim 6, wherein the schedule is selected to increase x-ray brightness compared with steady-state operation without replacement.

8. The system of claim 6, wherein the schedule is selected to replace electron bunches at a rate that is at least about 10 Hz.

9. The system of claim 6, wherein the schedule is selected to improve x-ray flux within a selected x-ray bandwidth compared with steady-state operation without replacement.

10. The system of claim 6, wherein said x-ray source generates x-rays by 180 degree Compton backscattering, said optical system comprising a passive high-finesse optical resonator having an optical path coaxial with said interaction point, said passive high-finesse optical resonator resonantly pumped by a mode-locked laser to build up an internally circulating photon pulse and including a mirror reflective to said photon pulses and transmissive to x-rays.

11. A method of improving x-ray output in a system generating x-rays by Compton backscattering, comprising:

providing an electron storage ring configured to guide and maintain an electron bunch injected into said electron storage ring in a stable and closed orbit that circulates through an interaction point disposed along a portion of said electron storage ring;

providing photon pulses synchronized to interact with corresponding electron bunches at said interaction point to generate x-ray radiation via Compton backscattering; and synchronously replacing a circulating electron bunch with a fresh electron bunch according to a schedule so that the electron storage ring nearly continuously stores an electron bunch available for Compton backscattering with the schedule being selected to improve x-ray output characteristics of the system by reducing the degradation over time of at least one attribute related to the emission of x-rays by Compton backscattering.

* * * * *